(12) United States Patent
Ohtake et al.

(10) Patent No.: US 11,229,857 B2
(45) Date of Patent: Jan. 25, 2022

(54) SEPARATION APPARATUS

(71) Applicants: HANEDA ZENITH CO., LTD., Tokyo (JP); TOYOTA JIDOSHA KABUSHIKI KAISHA, Toyota (JP)

(72) Inventors: Yoshitaka Ohtake, Nisshin (JP); Yasuto Kawamoto, Nisshin (JP); Yuki Kurosawa, Nagoya (JP); Kohei Kanazawa, Toyota (JP); Kotaro Ishida, Sakura (JP); Haruka Ueki, Tokyo (JP)

(73) Assignees: HANEDA ZENITH CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 16/456,939

(22) Filed: Jun. 28, 2019

(65) Prior Publication Data

US 2020/0001205 A1 Jan. 2, 2020

(30) Foreign Application Priority Data

Jun. 28, 2018 (JP) .............................. JP2018-122603

(51) Int. Cl.
  *B01D 17/02* (2006.01)
  *B01D 36/04* (2006.01)
  *B01D 21/00* (2006.01)

(52) U.S. Cl.
  CPC ...... *B01D 17/0214* (2013.01); *B01D 17/0211* (2013.01); *B01D 21/0012* (2013.01); *B01D 21/0042* (2013.01); *B01D 36/04* (2013.01)

(58) Field of Classification Search
  CPC ............ B01D 17/0211; B01D 17/0214; B01D 17/0217; B01D 21/0012; B01D 21/003;
  (Continued)

(56) References Cited

U.S. PATENT DOCUMENTS

| | | | | |
|---|---|---|---|---|
| 4,092,249 A | * | 5/1978 | La Gatta | .................. C02F 3/24 |
| | | | | 210/195.1 |
| 4,139,471 A | * | 2/1979 | Foti | ......................... C02F 3/301 |
| | | | | 210/170.06 |

(Continued)

FOREIGN PATENT DOCUMENTS

| | | |
|---|---|---|
| JP | 2009-220096 A | 10/2009 |
| JP | 4668290 B2 | 4/2011 |

*Primary Examiner* — Dirk R Bass
(74) *Attorney, Agent, or Firm* — Oliff PLC

(57) ABSTRACT

A separation apparatus includes: a partitioning member inside a separation tank, includes erect and transverse portions, and partitions the tank into inflow and outflow regions of a liquid; an inlet of which a lower level is set to be lower than an upper end of the erect portion and an upper level is set to be higher; a screen in the erect portion along a flow direction of the liquid; a swirling inducing member in the erect portion intersecting with the flow direction of the liquid; a screen in the transverse portion; a dividing member dividing the liquid flowing in from the inlet into flows along side walls of the separation tank; a retaining member at a downstream side in the flow direction and retains the substance having the specific gravity less than that of the liquid; and an outlet through which the liquid flows out from the outflow region.

5 Claims, 2 Drawing Sheets

(58) Field of Classification Search
CPC ............ B01D 21/0033; B01D 21/0042; B01D 21/0087; B01D 21/2405; B01D 21/2433; B01D 36/04
See application file for complete search history.

(56) References Cited

U.S. PATENT DOCUMENTS

| | | | | |
|---|---|---|---|---|
| 7,138,048 B1 * | 11/2006 | O'Connor | ................. | E03F 5/14 |
| | | | | 210/136 |
| 2011/0000862 A1 * | 1/2011 | Semba | ................... | B01D 29/03 |
| | | | | 210/787 |

* cited by examiner

SEPARATION APPARATUS

TECHNICAL FIELD

The present invention relates to a separation apparatus for separating a substance and a solid included in, for example, a liquid such as a discharged liquid or discharged water from a factory, the substance having a specific gravity less than that of the liquid and thus floating on the liquid, and the solid having a specific gravity greater than that of the liquid.

BACKGROUND ART

As an apparatus which separates a solid included in a discharged liquid, for example, a separation apparatus described in Patent Literature 1 has been suggested. This separation apparatus separates the solid by disposing a screen for separating the solid along a flow of the discharged liquid.

The separation apparatus described in Patent Literature 1 includes a separation tank partitioned into an inflow chamber and an outflow chamber by using the screen, an inlet through which the discharged liquid flows in is provided in an end surface of one side of the inflow chamber, and an inducing portion which swirls the discharged liquid in the inside of the inflow chamber is provided on the end surface and an end surface opposite to the end surface. Further, the screen is disposed on a side surface along the flow of the discharged liquid swirling in the inflow chamber.

An outlet for allowing the discharged liquid after separating the solid to flow out to the outside of the separation tank is connected to the outflow chamber, and an outflow pipe connected to the outlet extends at an upward gradient up to a position which corresponds to a water level substantially equal to that of the inlet.

In the separation apparatus, as the discharged liquid flows into the inflow chamber from the inlet, water levels in the inflow chamber and the outflow chamber rise. Further, when the water level in the inflow chamber rises more than a lower level of the inlet, liquid flows out through the outflow pipe extending from the outlet. While the discharged liquid continuously flows into the inflow chamber and flows out from the outflow chamber, the discharged liquid flowing into the inflow chamber flows along a surface of the screen while swirling due to induction by the inducing portion.

Further, in a process in which the discharged liquid swirls in the inflow chamber, the solid is deposited in the inside of the inflow chamber without passing through the screen and a liquid component passes through the screen and flows to the outflow chamber, thereby making it possible to separate the solid included in the discharged liquid. In addition, the solid deposited in the inflow chamber is discharged by, for example, opening a discharge valve provided in a bottom portion of the inflow chamber, or by opening an upper portion of the inflow chamber and using a bucket or the like.

CITATION LIST

Patent Literature

Patent Literature 1: JP 4668290 B2

SUMMARY OF INVENTION

Technical Problem

In the invention described in Patent Literature 1, the upper portion of the inflow chamber is closed, a flow of the flowing-in discharged liquid becomes a swirling flow in the inflow chamber, and the solid is separated in this swirling process. For this reason, when, for example, oil or the like is included in the discharged liquid, it is not possible to separate such a substance.

A discharged liquid or discharged water from a factory often includes a substance such as oil or the like having a specific gravity less than that of a liquid component of the discharged liquid or the discharged water, and it is necessary to remove the substance before discharging or in a case of reuse. For this reason, the oil or the like included in the discharged liquid or the discharged water is processed in a processing facility. However, the processing facility removes all the oil or the like included in the discharged liquid or the discharged water, which is a very burden process.

Accordingly, if most of the oil or the like included in the discharged liquid or the discharged water can be removed in an upstream side of the processing facility, a burden on the processing facility can be alleviated, which is advantageous. Therefore, in fact, development of a separation apparatus which can remove a substance included in a discharged liquid or discharged water from a factory and floating due to a low specific gravity thereof has been demanded.

An object of the present invention is to provide a separation apparatus capable of separating a substance included in a liquid and having a specific gravity less than that of the liquid, and separating a solid having a specific gravity greater than that of the liquid.

Solution to Problem

A representative separation apparatus according to the present invention for solving the problems described above is a separation apparatus which separates a substance included in a liquid and having a specific gravity less than a specific gravity of the liquid, the separation apparatus including: a separation tank; a partitioning member which is disposed in the inside of the separation tank, includes an erect portion having a height lower than a height of each of side walls of the separation tank and a transverse portion disposed between the erect portion and the side walls of the separation tank, and partitions an inside of the separation tank into an inflow region and an outflow region of the liquid; an inlet which is opened in the inflow region, of which a lower level is set to be lower than an upper end of the erect portion of the partitioning member and an upper level is set to be higher than the upper end, and through which the liquid flows into the inflow region; a screen which is disposed in the erect portion along a flow direction of the liquid flowing into the inflow region in the partitioning member and through which the liquid passes from the inflow region to the outflow region; a swirling inducing member which is disposed in the erect portion intersecting with the flow direction of the liquid flowing into the inflow region in the partitioning member and induces the liquid to swirl; a screen which is disposed in the transverse portion in the partitioning member and through which the liquid passes from the inflow region to the outflow region; a dividing member which is disposed opposite to the inlet and divides the liquid flowing in from the inlet into flows along the side walls of the separation tank; a retaining member which is disposed at a downstream side in the flow direction of the liquid divided by the dividing member and retains the substance included in the liquid and having the specific gravity less than the specific gravity of the liquid; and an outlet which is opened in the outflow region and through which the liquid flows out from the outflow region.

Advantageous Effects of Invention

The separation apparatus according to the present invention can separate a substance (for example, particles such as a solid, which can float on a liquid like floating debris, or oil, hereinafter, referred to as "floating matter") and a solid (hereinafter, simply referred to as the "solid") included in a liquid such as a discharged liquid or discharged water from a factory, the substance having a specific gravity less than that of the liquid, and the solid having a specific gravity greater than that of the liquid.

The separation tank is partitioned into the inflow region and the outflow region by the partitioning member disposed in the separation tank. The liquid flows into the inflow region through the inlet, and flows to the downstream side along the side wall of the separation tank by the dividing member disposed opposite to the inlet. The floating matter also flows to the downstream side together with the flow of the liquid, and is retained in the retaining member. Further, the solid is separated from the liquid by the screen provided in the erect portion of the partitioning member and the screen provided in the transverse portion, and remains in the inflow region.

Further, the liquid which passes through the screen disposed in the erect portion of the partitioning member and the screen disposed in the transverse portion and from which the floating matter and the solid are separated flows out to the outflow region. Accordingly, the floating matter flows in the upper layer of the inflow region and is retained in the retaining portion, the solid remains on the bottom surrounded by the erect portion and the screen of the transverse portion, and the liquid from which the floating matter and the solid are separated flows out from the outlet through the outflow region.

DESCRIPTION OF EMBODIMENTS

Figure 1:
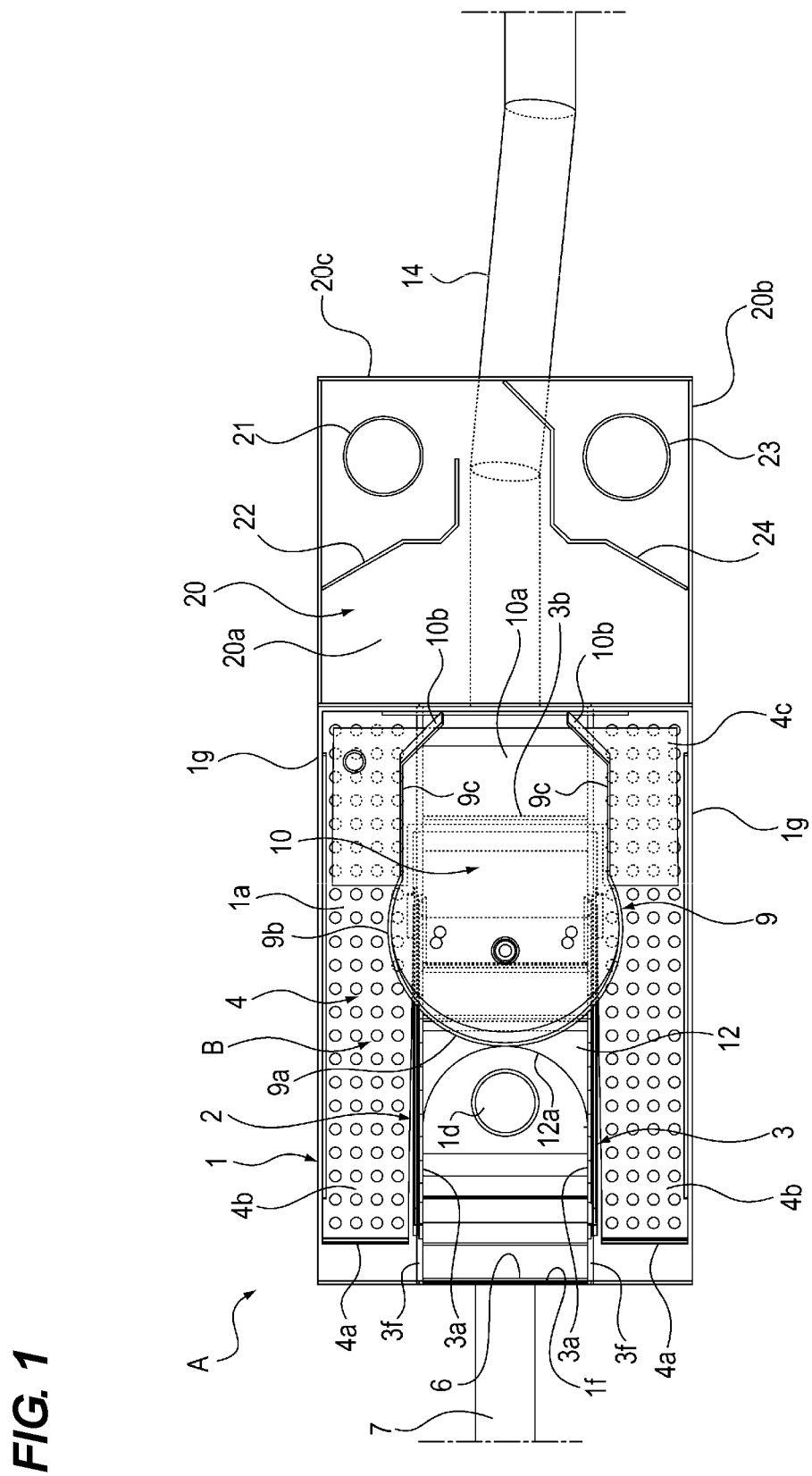
FIG. 1 is a plan view for describing a configuration of a separation apparatus.
Figure 2:
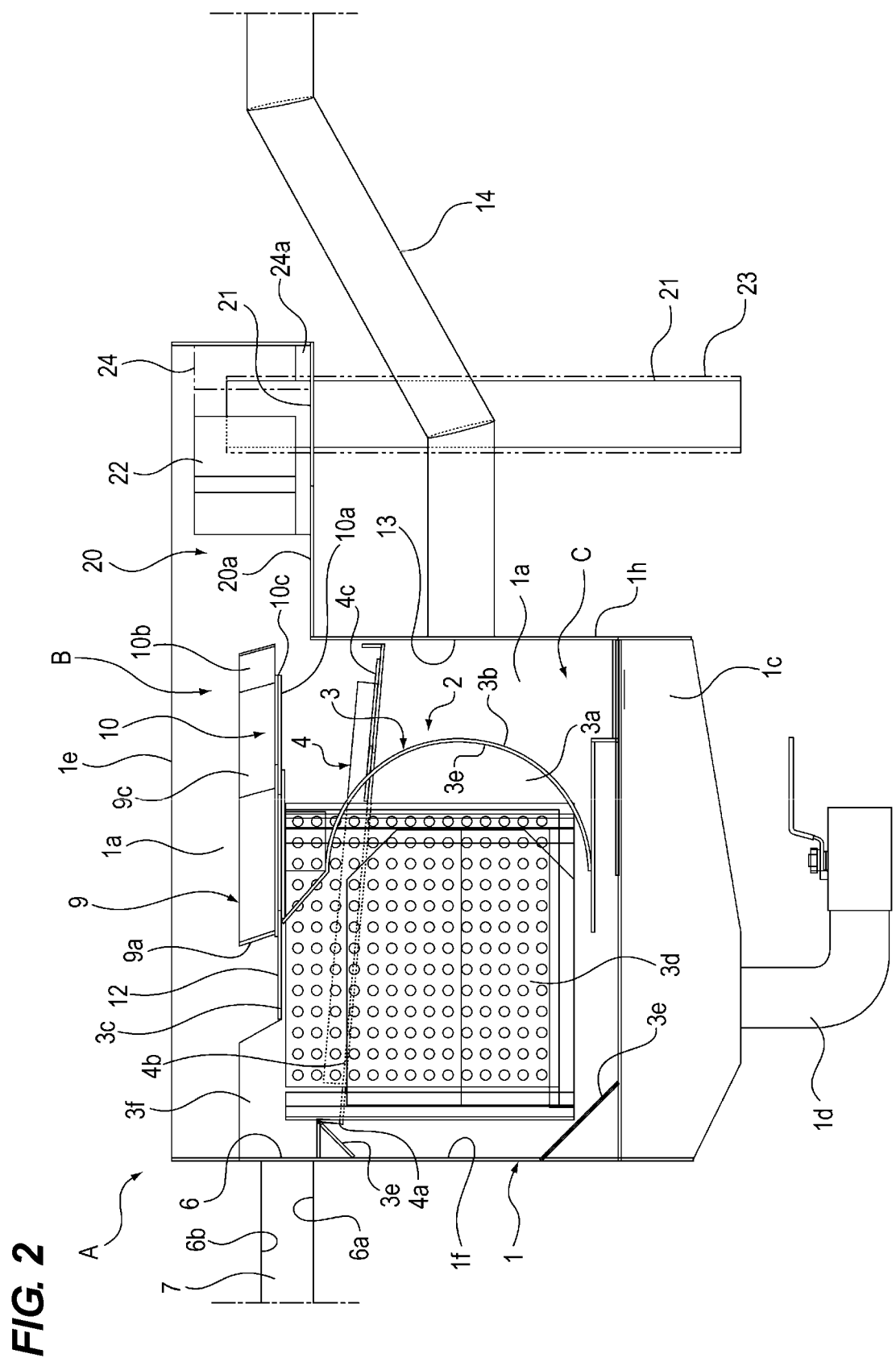
FIG. 2 is a side view for describing the configuration of the separation apparatus.

Hereinafter, a separation apparatus according to the present invention will be described. The separation apparatus according to the present invention can separate a substance (floating matter) and a solid included in, for example, liquid such as discharged liquid or discharged water from a factory, the substance having a specific gravity less than that of the liquid and thus floating on an upper layer of the liquid, and the solid having a specific gravity greater than that of the liquid.

A method for separating the floating matter and the solid included in the liquid by using the separation apparatus according to the present invention will be described briefly. In the separation apparatus according to the present invention, first, liquid including the floating matter and the solid and flowing into a separation tank is divided into an upper layer portion above a predetermined water level as a planar flow, and a lower layer portion below the water level as a swirling flow.

The planar flow of the upper layer portion is a flow along a side wall of the separation tank, which causes stagnation of a flow at a downstream side. As a result, it is possible to float the floating matter on a surface of the planar flow. Further, it is possible to retain the floating matter by maintaining a state in which the floating matter floats on the surface of the liquid. At this time, it is possible to continue the flow of the liquid including the floating matter along the side wall of the separation tank by flowing a part of the stagnant liquid downward.

Further, the solid included in the liquid flowing in the upper layer portion falls during the flowing, and does not pass through a screen transversely disposed at a predetermined height position but remains on the screen, thereby being separated from the liquid. By doing so, it is possible to separate the solid from the liquid.

In addition, a flow of the liquid of the lower layer portion below the predetermined water level is a high-speed swirling flow, and in a process of maintaining the swirling state, the solid included in the liquid is separated from the liquid without passing through the screen. By doing so, it is possible to separate the solid from the liquid. Further, when the liquid flows into the separation tank, the floating matter caught in the lower layer portion and passing through the screen together with the liquid can float due to a decrease in flow velocity of the liquid after passing through the screen and join the planar flow of the upper layer portion to thereby be separated from the liquid as described above.

A configuration of the separation apparatus according to the present embodiment will be described with reference to the drawings. A separation apparatus A includes a separation tank 1, and the separation tank 1 is partitioned into an inflow region B into which liquid flows and an outflow region C from which the liquid after separating floating matter and a solid flows out by a partitioning member 2 disposed in the inside of the separation tank 1.

The separation tank 1 includes a tank portion 1a which has a predetermined plane dimension and a predetermined depth dimension and in which the partitioning member 2 is disposed, and a discharge portion 20 which is shallower than the tank portion 1a is formed at an end portion of a downstream side in a flow direction of the liquid flowing into the inflow region B. The discharge portion 20 is configured to perform a function of discharging the floating matter and a function of maintaining a water level in the separation tank 1 as will be described later. Further, a depositing portion 1c in which the solid separated from the liquid is deposited is provided on a bottom portion of the tank portion 1a, and a deposition discharge pipe 1d is connected to the depositing portion 1c.

The partitioning member 2 includes an erect portion 3 having a dimension smaller than that of the tank portion 1a of the separation tank 1, and a transverse portion 4 disposed in a gap formed between the erect portion 3 and the tank portion 1a. The erect portion 3 includes a pair of side walls 3a erected along the flow direction of the liquid, and one end wall 3b erected while being connected to end portions of the side walls 3a in a direction intersecting with the flow of the liquid. A position of an upper end 3c of the erect portion 3 is set to be sufficiently lower than a position of an upper end 1e of the separation tank 1, and an upper surface of the erect portion 3 is opened.

Screens 3d are disposed on the side walls 3a of the erect portion 3, and swirling inducing members 3e which induce swirling of the flowing-in liquid are disposed on the end wall 3b and an end wall 1f of the separation tank 1.

Further, there is no need to necessarily include a pair of side walls 3a of the erect portion 3, and one side wall may be shared as a side wall 1g of the separation tank 1. Further, the number of end walls 3b may also not necessarily be one, and a pair of end walls 3b may be provided in the direction intersecting with the flow of the liquid.

The transverse portion 4 constituting the partitioning member 2 is disposed at a position lower than the upper end 3c of the erect portion 3 in the gap formed between the erect portion 3 and the tank portion 1a of the separation tank 1 in a state in which the transverse portion 4 is inclined downwardly from an upstream side to a downstream side in the flow direction of the liquid in the inflow region B. In particular, an end portion 4a of the upstream side in the flow direction of the liquid and the end wall 1f of the separation tank 1 are not in contact with each other, and a gap is formed therebetween. Further, screens 4b are disposed at positions corresponding to the screens 3d disposed on the side walls 3a of the erect portion 3, respectively, and a plate portion 4c through which the liquid does not pass is formed at a further downstream side in the flow direction of the liquid in comparison to the screens 4b.

Accordingly, a region including a space in a plane surrounded by the pair of side walls 3a and the end wall 3b of the erect portion 3 and the end wall 1f of the tank portion 1a, and a space which is a gap between the erect portion 3 and the tank portion 1 and is above the transverse portion 4 in the separation tank 1 is the inflow region B of the liquid. Further, a space which is a gap between end walls 1f and 1h and the side walls 1g of the tank portion 1a, and the erect portion 3, and of which an upper portion is defined by the transverse portion 4 is the outflow region C.

Further, structures of the screens 3d and 4b are not particularly limited, and any structure having a function of passing the liquid without passing a solid having a previously presumed size can be used. As the screen described above, for example, a punching metal in which a number of holes having a predetermined dimension are formed can be used.

The inlet 6 is disposed at a position in the end wall 1f of the separation tank 1 so that a lower level 6a is lower than the upper end 3c of the erect portion 3 constituting the partitioning member 2 and an upper level 6b is higher than the upper end 3c. Further, an inflow pipe 7 connected to a liquid supply source (not illustrated) is connected to the inlet 6, such that the liquid including the floating matter and the solid flows into the inflow region B of the separation tank 1.

In particular, guide portions 3f each having a height higher than the upper level 6b of the inlet 6 are formed in portions of the erect portion 3 constituting the partitioning member 2, which sandwiches the inlet 6 therebetween, and can guide the flow direction of the liquid flowing in from the inlet 6.

A dividing member 9 is disposed opposite to the inlet 6. The dividing member 9 divides the liquid flowing into the inflow region B from the inlet 6 into flows along the side walls 1g of the separation tank 1, and a collision portion 9a opposite to the inlet 6 has an arc shape when viewed from a plane. Further, the dividing member 9 is formed so that a maximum width portion 9b of the collision portion 9a has a dimension larger than a width dimension of a pair of erect portions 3 of the partitioning member 2, and parallel portions 9c, of which a width dimension therebetween is smaller than that of the maximum width portion 9b, are formed at a further downstream side in the flow direction in comparison to the maximum width portion 9b.

The width dimension of the maximum width portion 9b of the dividing member 9 is larger than the width dimension between the pair of erect portions 3. Therefore, the dividing member 9 is placed on the upper end 3c of the erect portion 3. For this reason, a portion of the liquid flowing into the inflow region B above the upper end 3c of the erect portion 3 collides with the collision portion 9a of the dividing member 9 to flow along the side walls 1g of the separation tank 1, thereby flowing toward the downstream side along the parallel portions 9c.

In the present embodiment, the liquid flowing into the inflow region B from the inlet 6 is substantially equally divided into flows along two side walls 1g of the separation tank 1 by the dividing member 9. However, the liquid need not be necessarily equally divided, and the flows along the side walls 1g may be changed by disposing the dividing member 9 to be biased to any one side wall 1g.

A retaining member 10 is disposed at a downstream side of the dividing member 9. The dividing member 9 and the retaining member 10 have different functions, and can be implemented independently of each other. In the present embodiment, however, the retaining member 10 is formed substantially integrally with the dividing member 9.

That is, since it is sufficient that the dividing member 9 can perform the function of dividing the flowing-in liquid into the flows along the side walls 1g of the separation tank 1, the collision portion 9a is formed by bending a flat bar in an arc shape, and the parallel portions 9c are formed, in parallel to each other, continuously from the maximum width portion 9b of the collision portion 9a. Therefore, a region surrounded by the dividing member 9 is formed, and the region becomes a retaining portion of the retaining member 10.

The retaining member 10 is formed by closing a plane region surrounded by the dividing member 9 as described above with a bottom plate 10a. In particular, a suppressing portion 10b is formed by bending free ends of the parallel portions 9c of the dividing member 9 so that the free ends are spaced apart from the side walls 1g of the separation tank 1, respectively (so that the free ends of the pair of parallel portions 9c approach each other). Therefore, the dividing member 10 has a shape like a container by closing a bottom portion of the region of which an outer circumference is surrounded by the dividing member 9 with the bottom plate 10a, and is configured so that an escape of the floating matter introduced together with the liquid flows can be suppressed by the suppressing portions 10b.

A position of the bottom plate 10a constituting the retaining member 10 in the separation tank 1 in a depth direction coincides with that of the upper end 3c of the erect portion 3 constituting the partitioning member 2, and an upper portion of the erect portion 3 is closed with the bottom plate 10a. For this reason, it is possible to induce the swirling flow of the liquid in the erect portion 3 to be described later.

Further, an end portion 10c of the bottom plate 10a is set to be disposed at a position slightly back from the suppressing portions 10b toward the collision portion 9a of the dividing member 9, and positions of the free ends of the suppressing portions 10b substantially coincide with an upward-extending line from an end wall 1h of the tank portion 1a of the separation tank 1. Therefore, the liquid introduced into the retaining member 10 passes through a surface defined by the end portion 10c of the bottom plate 10a, the suppressing portions 10b, and the end wall 1h of the separation tank 1 and flows toward the plate portion 4c of the transverse portion 4 constituting the partitioning member 2.

A guiding member 12 is disposed opposite to the inlet 6 between the inlet 6 and the dividing member 9 and between the lower level 6a and the upper level 6b of the inlet 6. The guiding member 12 guides the flow of the liquid of the upper layer flowing in from the inlet 6 to be a planar flow toward the dividing member 9, and guides the flow of the liquid of the lower layer to be a flow toward the swirling inducing member 3e provided in the end wall 3b of the erect portion 3.

In particular, the guiding member 12 is formed in a flat plate shape, and an end portion 12a opposite to the inlet 6 has a curved shape of which a central portion is concave when viewed from a plane. For this reason, even in a case where the solid included in the flowing-in liquid is caught by the end portion 12a, the solid is transported to a center portion due to the flow of the flowing-in liquid, and thus can escape due to the swirling flow in a lower side.

An outlet 13 is formed at a position corresponding to the outflow region C of the separation tank 1, and an outflow pipe 14 is connected to the outlet 13. The outflow pipe 14 is formed to ascend from the outlet 13 so that an end portion of an outflow side reaches substantially the same water level as the inlet 6 or a water level slightly lower than the inlet 6. Therefore, when the separation tank 1 is fully filled, the liquid in the outflow region C starts to flow from the end portion of the outflow pipe 14, and it is possible to form a flow of the liquid in the inside of the separation tank 1.

The discharge portion 20 provided in the separation tank 1 is configured to be able to perform the function of discharging the floating matter floating on a surface layer of the inflow region B and retained in the retaining member 10, and the function of maintaining a water level in the separation tank 1. A height position of a bottom plate 20a of the discharge portion 20 substantially coincides with the same as the lower level of the inlet 6 opening in the end wall 1f of the separation tank 1, and is slightly lower than that of the bottom plate 10a of the retaining member 10. Further, the discharge portion 20 is defined by side walls 20b each having the same height as that of each of the side walls 1g of the separation tank 1 and erected around the bottom plate 20a, and an end wall 20c connecting the side walls 20b to each other.

A discharge pipe 21 formed in the bottom plate 20a for discharging the floating matter is connected to the discharge portion 20, and the discharge pipe 21 can be opened or closed with a valve (not illustrated). In addition, a guide plate 22 which guides the flow of the liquid is disposed around the discharge pipe 21 from the side wall 20b to the end wall 20c, and the liquid above the bottom plate 20a in the inflow region B can flow toward the discharge pipe 21 through a gap between the guide plate 22 and the end wall 20c. However, in a state the discharge pipe 21 is closed, the liquid does not flow out through the discharge pipe 21, and stagnation of the liquid occurs in the discharge portion 20.

An overflow pipe 23 is connected to the discharge portion 20. The overflow pipe 23 has a function of maintaining a predetermined maximum water level in the separation tank 1. For this reason, the overflow pipe 23 penetrates through the bottom plate 20a and has an opening formed at a height position corresponding to the maximum water level. Further, the overflow pipe 23 is surrounded by a retaining wall 24 which is formed continuously from the side wall 20b to the end wall 20c and is higher than the overflow pipe 23. In addition, a gap 24a is formed between the retaining wall 24 and the bottom plate 20a, such that the liquid can flows in through the gap 24a.

Next, an operation of the separation apparatus A configured as described at the time of separating the floating matter and the solid included in the liquid will be described. The separation of the floating matter and the solid by the separation apparatus A is performed when the inside of the separation tank 1 is fully filled and a state in which the liquid flows out through the outflow pipe 14 is maintained.

The liquid flowing in from the inlet 6 to the inflow region B is divided into two flows by the guiding member 12. That is, the liquid above the guiding member 12 collides with the collision portion 9a of the dividing member 9 disposed opposite to the inlet 6 and flows along the side walls 1g of the separation tank 1. Further, a portion of the flow becomes a flow toward the retaining member 10, and a portion of the flow flows over the side walls 3a of the erect portion 3 and then flows toward the screens 4b of the transverse portion 4 along the side walls 1g of the separation tank 1.

The flows along the side walls 1g of the separation tank 1 join each other at a portion corresponding to the suppressing portion 10b of the retaining member 10. However, a liquid surface slightly rises due to a collision of the flows at the joining portion, which results in partially introduction of the floating matter into the retaining member 10. Further, the flow of the floating matter caused by the rising of the liquid surface is directed not only to the retaining member 10 but also to the discharge portion 20. Since the liquid does not actively flow in the retaining member 10 and the discharge portion 20, each floating matter maintains an introduced state. In particular, the floating matter introduced into the retaining member 10 is suppressed from flowing out from the retaining member 10 by the suppressing portion 10b, such that the floating matter is continuously retained in the retaining member 10.

However, the gap is formed between the end portion 10c of the bottom plate 10a of the retaining member 10 and the end wall 1h of the separation tank 1, and the liquid flows through the gap. Therefore, the flows of the liquid divided by the dividing member 9 along the side walls 1g can be continued. In particular, since the plate portion 4c through which the liquid does not pass is formed adjacent to the end wall 1h of the separation tank 1 at a further downstream side in the flow direction of the liquid in comparison to the screens 4b of the transverse portion 4, the liquid can flow at a decreased flow velocity.

The floating matter in the upper layer of the liquid flowing in as described above is retained in the retaining member 10 and in the discharge portion 20.

In addition, the liquid below the guiding member 12 flows toward the end wall 3b along the side walls 3a of the erect portion 3 and forms a swirling flow by the swirling inducing members 3e. The swirling flow is formed in a space defined by the pair of side walls 3a, the end wall 3b, and the end wall 1f of the separation tank 1. Further, in a process in which the liquid swirls, only the liquid passes through the screens 3d and flows into the outflow region C. At this time, the solid remaining without passing through the screens 3d escapes from the swirling flow and is deposited on a possible depositing portion 1c.

The floating matter included in the liquid flowing into the inflow region B does not always float, but generally is mixed with the liquid. Therefore, when the liquid is divided by the guiding member 12, the floating matter is caught in the swirling flow in some cases. Such a floating matter passes through the screens 3d and moves to the outflow region C together with the liquid. However, since the flow velocity of the liquid in the outflow region C is low, there is a possibility that the floating matter rises in the liquid. Further, even in a case where the floating matter collides with the transverse portion 4 in the process of rising, the floating matter can continuously rise along a slope of the transverse portion 4, flow from the end portions 4a into the inflow region B, float, and join the flows along the side walls 1g of the separation tank 1.

The liquid in the outflow region C passes through the outflow pipe 14 from the outlet 13 and is discharged through the outflow pipe 14. The discharging is continued while the liquid continuously flows into the separation tank 1, and the separation and retaining of the floating matter by the flow of the upper layer and the separation of the solid by the swirling flow of the lower layer are continued in the inside of the separation tank 1.

When the water level in the separation tank 1 rises, the liquid starts to flow through the overflow pipe 23 of the discharge portion 20, such that the water level is lowered. As a result, it is possible to always maintain a certain water level. In particular, the retaining wall 24 is disposed around the overflow pipe 23, and the liquid flows in through the gap 24a formed between the retaining wall 24 and the bottom plate 20a, and thus the floating matter is not introduced. For this reason, even in a case where a height at which the floating matter floats is increased as the water level in the separation tank 1 rises, the floating matter does not flow out through the overflow pipe 23.

In a case where the floating matter retaining in the retaining member 10 and the floating matter retaining in the discharge portion 20 are discharged from the separation tank 1, the flowing of the liquid into the inflow region B from the inlet 6 is stopped and a valve provided in the discharge pipe 21 is opened. Since the discharge pipe 21 is formed in the bottom plate 20a of the discharge portion 20, the liquid and the floating matter in a portion surrounded by the side walls 20b and the end wall 20c of the discharge portion 20, and the guide plate 22 are discharged.

As described above, a level of the bottom plate 20a of the discharge portion 20 is set to be substantially equal to the lower level of the inlet 6. For this reason, when the discharge pipe 21 is opened in a state in which the flow of the liquid from the inlet 6 is stopped, all the liquid and the floating matter above a level connecting the lower level of the inlet 6 and the bottom plate 20a of the discharge portion 20 to each other in the separation tank 1, are discharged. Further, it is possible to discharge all of deposition deposited on the depositing portion 1c and the liquid in the separation tank 1 by opening the deposition discharge pipe 1d after discharging all the liquid and the floating matter above the level connecting the lower level of the inlet 6 and the bottom plate 20a of the discharge portion 20 to each other.

As described above, it is possible to retain the floating matter including oil and included in the liquid flowing in from the inlet 6 in the retaining member 10 and discharge the floating matter through the discharge pipe 21, and discharge the solid through the deposition discharge pipe 1d to the outside of the separation tank 1. Accordingly, the liquid flowing out from the separation tank 1 through the outlet 13 and the outflow pipe 14 does not include the floating matter and the solid.

The separation apparatus according to the present invention should not necessarily be limited to the embodiment described above, and a modified embodiment within the scope of the present invention should be included.

For example, in the present embodiment, the dividing member 9 is disposed opposite to the inlet 6 so that flowing paths having substantially the same widths can be formed along the side walls 1g of the separation tank 1. However, the dividing member 9 may also be disposed to be biased to any one side wall 1g. In this case, the flow along the side walls 1g can collide with the other side wall at a position corresponding to the suppressing portion 10b of the retaining member 10 and be introduced into the retaining member 10 by disposing the dividing member 9 and the retaining member 10 to be biased to any one side wall 1g.

Further, a swirling inducing portion (not illustrated) is formed in the retaining member 10, such that it is possible to swirl the liquid introduced into the inside of the retaining member 10 and collect the floating matter at the center of a vortex. In particular, in a case where the discharge pipe is disposed at a portion corresponding to the center of the vortex, it is possible to discharge the collected floating matter by using the discharge pipe.

Further, lengths of the pair of suppressing portions 10b constituting the retaining member 10 need not be the same as each other, and a length of any one of the suppressing portions 10b may be longer than that of the other one. In this case, the liquid flowing in from the shorter suppressing portion 10b can collide with the longer suppressing portion 10b to be introduced into the inside of the retaining member 10.

INDUSTRIAL APPLICABILITY

The separation apparatus according to the present invention can separate floating matter or a solid from a liquid such as a discharged liquid or discharged water from a factory. Therefore, it is advantageous to use the separation apparatus as a preprocessing apparatus of a water treatment plant for separating the floating matter and the solid.

REFERENCE SIGNS LIST

A Separation apparatus
B Inflow region
C Outflow region
1 Separation tank
1a Tank portion
1c Depositing portion
1d Deposition discharge pipe
1f, 1h, 3b, 20c End wall
1g, 3a, 20b Side wall
2 Partitioning member
3 Erect portion
3c Upper end
3d, 4b Screen
3e Swirling inducing member
3f Guide portion
4 Transverse portion
4a, 10c, 12a End portion
4c Plate portion
6 Inlet
6a Lower level
6b Upper level
7 Inflow pipe
9 Dividing member
9a Collision portion
9b Maximum width portion
9c Parallel portion
10 Retaining member
10a Bottom plate
10b Suppressing portion
12 Guiding member
13 Outlet
14 Outflow pipe
20 Discharge portion
20a Bottom plate
21 Discharge pipe
22 Guide plate
23 Overflow pipe 24 Retaining wall
24a Gap

The invention claimed is:

1. A separation apparatus which separates a substance included in a liquid and having a specific gravity less than a specific gravity of the liquid, the separation apparatus comprising:
    a separation tank;
    a partitioning member which is disposed in an inside of the separation tank, includes an erect portion having a height lower than a height of each of side walls of the separation tank and a transverse portion disposed between the erect portion and the side walls of the separation tank, and partitions the inside of the separation tank into an inflow region and an outflow region of the liquid;
    an inlet which is opened in the inflow region, of which a lower level is set to be lower than an upper end of the erect portion of the partitioning member and an upper level is set to be higher than the upper end, and through which the liquid flows into the inflow region;
    a screen which is disposed in the erect portion along a flow direction of the liquid flowing into the inflow region in the partitioning member and through which the liquid passes from the inflow region to the outflow region;
    a swirling inducing member which is disposed in the erect portion intersecting with the flow direction of the liquid flowing into the inflow region in the partitioning member and induces the liquid to swirl;
    a screen which is disposed in the transverse portion in the partitioning member and through which the liquid passes from the inflow region to the outflow region;
    a dividing member which is disposed opposite to the inlet and divides the liquid flowing in from the inlet into flows along the side walls of the separation tank;
    a retaining member which is disposed at a downstream side in the flow direction of the liquid divided by the dividing member and retains the substance included in the liquid and having the specific gravity less than the specific gravity of the liquid; and
    an outlet which is opened in the outflow region and through which the liquid flows out from the outflow region.

2. The separation apparatus according to claim 1, further comprising:
    a guiding member which is disposed opposite to the inlet between the inlet and the dividing member and between the lower level and the upper level of the inlet and guides the liquid flowing into the inflow region by dividing the liquid into a flow toward the dividing member and a flow toward the swirling inducing member disposed in the erect portion.

3. The separation apparatus according to claim 1, further comprising:
    guide members which are formed at opposite sides of the inlet opened in the inflow region, respectively, and each of which has a height higher than the upper level of the inlet and guides the liquid to flow toward the dividing member.

4. The separation apparatus according to claim 1, wherein a discharge path, which has a bottom surface formed on substantially the same level as the lower level of the inlet and includes a discharge port opened in the bottom surface and an opening and closing valve, is provided at a downstream side of the retaining member disposed at the downstream side in the flow direction of the liquid divided by the dividing member.

5. The separation apparatus according to claim 1, wherein a level maintaining path having an opening formed at a position higher than the upper level of the inlet and lower than upper ends of the side walls of the separation tank, and a wall surrounding the level maintaining path, having a height higher than the opening of the level maintaining path, and having a passage for the liquid formed at a position lower than the opening of the level maintaining path are provided at a downstream side of the retaining member disposed at the downstream side in the flow direction of the liquid divided by the dividing member.

* * * * *